United States Patent [19]

Taki et al.

[11] Patent Number: 4,640,779
[45] Date of Patent: Feb. 3, 1987

[54] FILTER ELEMENT

[75] Inventors: Yoshihiro Taki, Nagoya; Hajime Akado, Anjo; Keizo Funae; Satoshi Inukai, both of Kariya, all of Japan

[73] Assignee: Nippondenso Co., Ltd., Kariya, Japan

[21] Appl. No.: 661,188

[22] Filed: Oct. 15, 1984

[30] Foreign Application Priority Data

| Oct. 18, 1983 | [JP] | Japan | 58-194605 |
| Feb. 20, 1984 | [JP] | Japan | 59-31204 |
| Mar. 12, 1984 | [JP] | Japan | 59-47640 |
| Apr. 23, 1984 | [JP] | Japan | 59-82762 |
| Jun. 28, 1984 | [JP] | Japan | 59-134778 |
| Jun. 28, 1984 | [JP] | Japan | 59-134779 |

[51] Int. Cl.$^4$ ............................................ B01D 27/06
[52] U.S. Cl. ............................... 210/493.5; 210/509; 55/500; 55/521; 55/529; 55/DIG. 42
[58] Field of Search ............... 210/483, 487, 493.1, 210/493.2, 493.3, 493.4, 493.5, 510.1, 509; 55/500, 521, 529, DIG. 42

[56] References Cited

U.S. PATENT DOCUMENTS

| 1,728,305 | 9/1929 | Raney | 210/493.1 |
| 2,298,980 | 10/1942 | Sloan et al. | 210/493.5 |
| 2,768,752 | 10/1956 | Thatcher | 210/169 |
| 3,127,341 | 3/1964 | Abeles | 210/493.3 |
| 3,279,616 | 10/1966 | Bourdale | 210/493.5 |
| 3,280,985 | 10/1966 | Czerwonka | 210/493.1 |
| 3,417,551 | 12/1968 | Bonell | 210/493.1 |
| 3,448,862 | 6/1969 | Kudlaty | 210/493.5 |
| 3,490,211 | 1/1970 | Cartier . | |
| 3,591,010 | 7/1971 | Pall | 210/509 |
| 4,154,688 | 5/1979 | Pall | 210/493.2 |
| 4,178,161 | 12/1979 | Rudner et al. | 55/DIG. 42 |
| 4,290,889 | 9/1981 | Erickson | 210/493.2 |
| 4,396,407 | 8/1983 | Reese | 55/DIG. 42 |
| 4,452,619 | 6/1984 | Wright et al. | 210/493.5 |

FOREIGN PATENT DOCUMENTS

| 728602 | 10/1942 | Fed. Rep. of Germany | 55/521 |
| 1955789 | 5/1971 | Fed. Rep. of Germany | 210/493.1 |
| 1386769 | 12/1964 | France . | |
| 140672 | 12/1978 | Japan | 210/493.1 |
| 602157 | 7/1978 | Sweden | 210/493.1 |
| 725066 | 3/1955 | United Kingdom | 55/521 |
| 734358 | 7/1955 | United Kingdom | 210/493.1 |
| 1426173 | 2/1976 | United Kingdom | 210/493.1 |
| 436668 | 12/1974 | U.S.S.R. | 210/493.1 |

Primary Examiner—Richard V. Fisher
Assistant Examiner—Wanda L. Millard
Attorney, Agent, or Firm—Cushman, Darby & Cushman

[57] ABSTRACT

A filter element has a generally ring-like structure which basically comprises a plurality of generally radial sections circumferentially arranged to define a central space. Each radial section has a plurality of circumferentially zigzag pleats formed from a ribbon of a filtering sheet material. The radial sections are circumferentially connected such that radially inwardly open generally radial spaces and radially outwardly open generally radial spaces are defined. The radially inwardly open radial spaces are closed at the axially opposite ends by end walls. Fluid to be filtrated can enter the radially outwardly open radial spaces and then passes through the zigzag pleats into the radially inwardly open radial spaces and thus into the central space. The ring-like structure has many modifications.

17 Claims, 39 Drawing Figures 4,640,779

FILTER ELEMENT

FILED OF THE INVENTION

The present invention relates to a filter element suitable for use, for example, in a lubricant filter used in a machine such as an internal combustion engine.

DESCRIPTION OF THE PRIOR ART

A filter element of the class specified above is disclosed in U.S. Pat. No. 2,768,752. The filter element comprises a generally ring-shaped structure formed by a plurality of pleats formed by a filtering sheet material. The pleats are arranged so that the webs of each of the pleats are disposed in substantially face-to-face contacting relationship. Fluid is passed through the contacting portions of each pleat so that dusts and sludge are removed from the fluid. This type of filter element is called "surface filter" type.

In order that the prior art filter element may efficiently filtrate fluids, the dimensions of the contacting zones of the pleats, namely, the radial dimension of the ring-like structure of the filtering material must be increased. The increase in the radial dimension, however, results in the possibility that the mechanical strength of the pleats is decreased causing deformation thereof.

A second disadvantage of the prior art filter element is that the filter element provides a smaller filtering surface area relative to a relatively bulky size thereof.

SUMMARY OF THE INVENTION

The present invention aims at eliminating the above-discussed prior art problems by providing an improved filter element having a novel structure entirely distinct from the prior art filter element structure.

DESCRIPTION OF THE PREFERRED EMBODIMENTS

Figure 5:
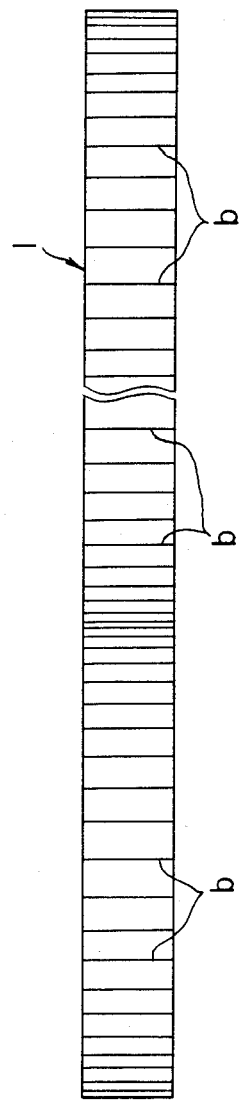
FIG. 5 shows the filtering sheet material in unfolded position.
Figure 6:
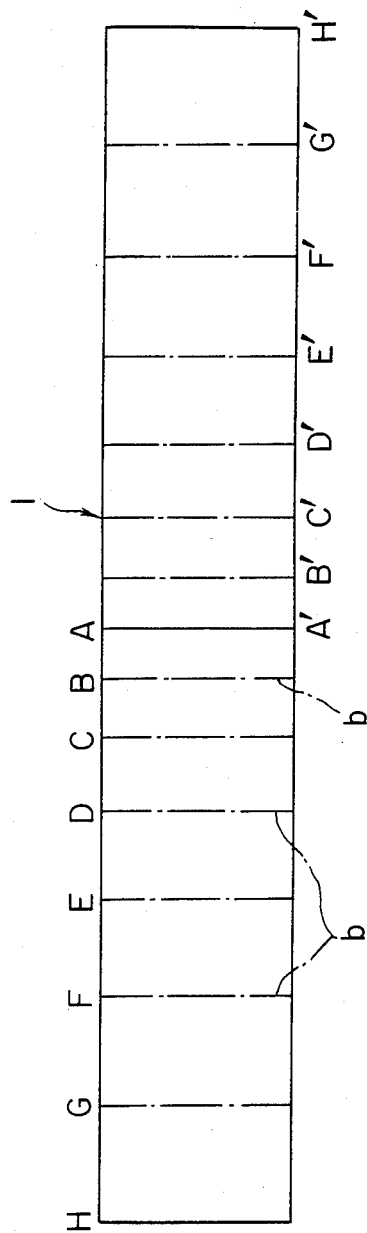
FIG. 6 shows a part of the filtering sheet material in an enlarged scale.

Referring first to FIGS. 1 to 7 of the drawings, a generally ring-like structure 10 is formed by folding a length of ribbon 1 of a filtering sheet material shown in FIGS. 5 and 6 and defines a central space 4. The structure 10 includes a plurality of generally radial sections 1a each having a plurality of zigzag pleats 1b. The radial sections 1a are disposed circumferentially of the central space 4 and arranged such that the pleats 1b extend generally circumferentially of the axis of the central space 4 and such that generally radial spaces 2a and 2b are defined between respective circumferentially adjacent pairs of the radial sections 1a.

Figure 1:
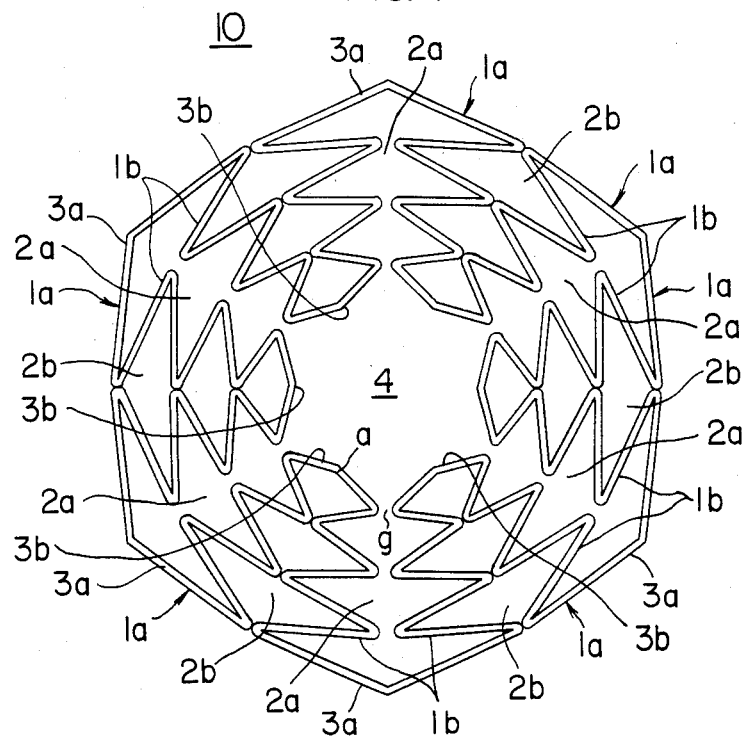
FIG. 1 is a plan view of an embodiment of a ring-shaped structure of a filtering sheet material which forms a part of the filter element according to the present invention.
Figure 2:
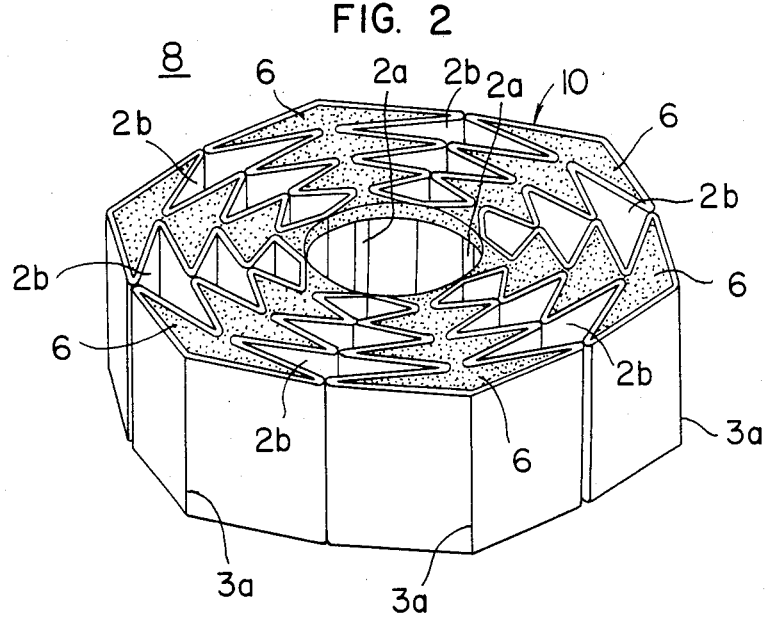
FIG. 2 is a perspective view of an embodiment of the filter element according to the present invention.
Figure 3:
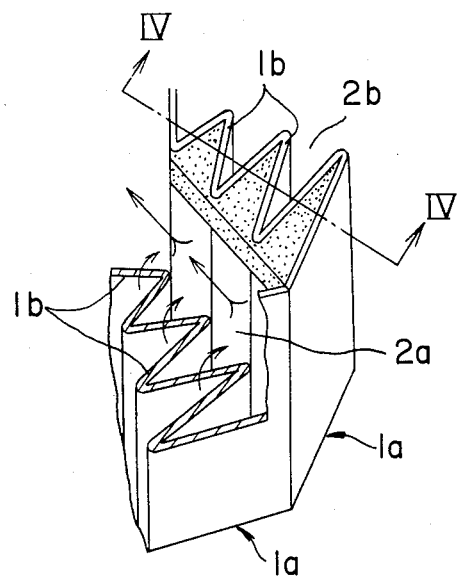
FIG. 3 is a fragmentary, enlarged perspective view of the filter element with a part cut away to show the inner structure.
Figure 4:
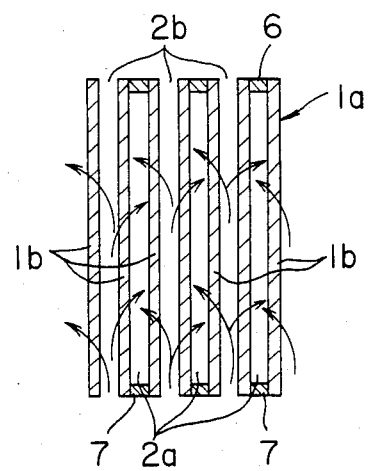
FIG. 4 is a sectional view of the filter element taken along line IV—IV in FIG. 3.

Each of the radial spaces 2a is closed at the radially outer end by a web 3a continuous to the radially outermost pleats 1b of the radial sections 1a adjacent to the radial space 2a, whereas the each of the radial spaces 2b is closed at the radially inner end by a web 3b continuous to the radially innermost pleats 1b of the radial sections 1a adjacent to the radial space 2b. Thus, the radial spaces 2a are communicated with the central space 4, whereas the radial spaces 2b are separated by the webs 3b from the central space 4. The ends of the pleats 1b of the radial sections 1a adjacent to the radially inwardly open radial spaces 2a are circumferentially spaced to provide gaps indicated by g in FIG. 1. The ends of the continuous ribbon of the filtering sheet material thus folded into the ring-like shape shown in FIG. 1 are secured together by an adhesive a such as a heat-meltable polyamid-based adhesive.

The axial ends of the radially inwardly open radial spaces 2a are closed by top and bottom walls 6 and 7 formed by layers of plastic adhesive such as a heat-meltable polyamid-based adhesive to complete a filter element 8. Thus, the radial spaces 2a are open at their radially inner ends only.

Figure 7:
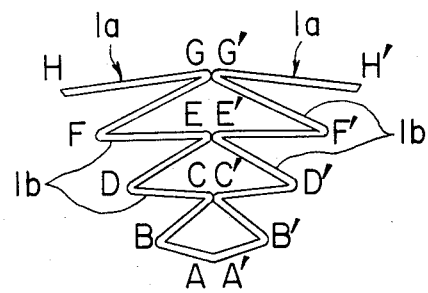
FIG. 7 is an enlarged plan view of a part of the ring-shaped structure formed by folding the part of the filtering sheet material shown in FIG. 6.

The ribbon 1 of the filtering sheet material is folded along crease lines b shown in FIG. 5. The crease lines b are spaced at intervals or distances which are varied in the longitudinal direction of the ribbon 1. The variation in the crease line spacings in two longitudinally adjacent zones is symmetrical with respect to a center line A—A', as will be seen in FIG. 6. Thus, the ring-like structure 10 shown in FIG. 1 can be prepared by folding the ribbon 1 along the symmetrically spaced crease lines b and by securing the ends of the ribbon 1 together. FIG. 7 shows a part of the ring-like structure 10 which is formed by the part of the ribbon 1 shown in FIG. 6. It will be seen that the crease lines A–H and A'–H' correspond to the bends or turns of the pleats 1b of two circumferentially adjacent radial sections 1a.

Then, the paths of flows of a fluid through the described structure of the filter element 8 will be discussed hereunder. If the filter element 8 is installed such that the fluid enters the filter element from below thereof, the fluid will first enter the radial spaces 2b from which the fluid passes into the radially inwardly open radial spaces 2a through the pleats 1b disposed between the radial spaces 2a and 2b. In each of the radially inwardly open radial spaces 2a, the fluid will flow radially inwardly through the gaps g defined between the circmferentially opposed ends of pleats 1b of the radial sections 1a adjacent to the radial section 2a until the fluid enters the central space 4. The filtration is effected when the fluid passes through the walls of the pleats 1b from the spaces 2b into the adjacent spaces 2a.

Figure 8:
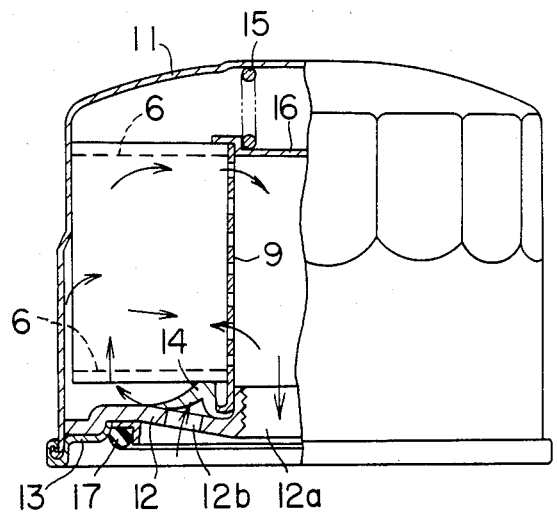
FIG. 8 is a partially sectional side elevation of a lubricant filter embodying the filter element according to the present invention.

The filter element described above can be used in a lubricant filter for an internal combustion engine. The lubricant filter will be discussed with reference to FIG. 8. The filter element 8 is disposed in a metallic container 11 with a perforated cylindrical member 9 of a metal disposed inside the ring-like structure of the filtering sheet material. The container 11 has an open end which, after the installation of the filter element 8 therein, is closed by an annular end plate 12 having a threaded central hole 12a and a plurality of small holes 12b disposed around the central hole 12. The outer periphery of the end plate 12 is hermetically secured to the peripheral edge of the container 11 by means of a ring 13 of a sheet metal which is welded to the end plate 12. A compression spring 15 is disposed between the bottom of the container 11 and a metallic end plate 16 secured to an end of the perforated cylindrical member 9. A check valve 14 made of rubber is disposed inside the end plate 12 adjacent to each of the small holes 12b therein. An annular gasket 17 of rubber is attached to the outer side of the ring 13 to form a fluid-tight seal when the filter is mounted on an associated internal combustion engine.

Figure 9:
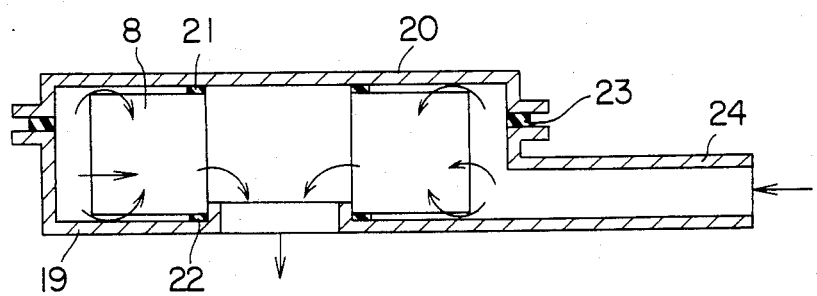
FIG. 9 is a sectional view of an air cleaner embodying the filter element according to the present invention.
Figure 10:
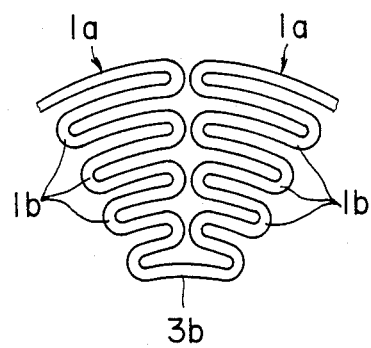
FIGS. 10 through 14 are plan views of modified forms of the radial sections of the ring-like structure.
Figure 12:
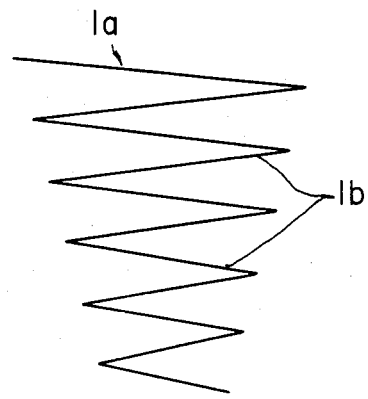
Figure 11:
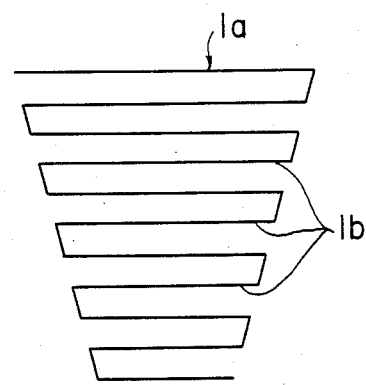
Figure 13:
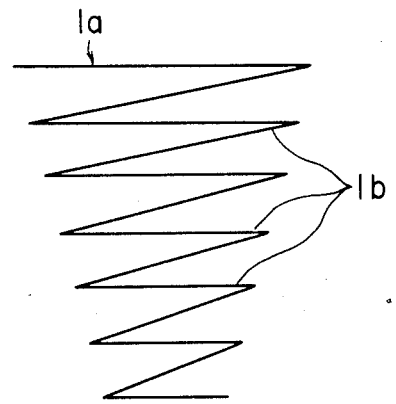
Figure 14:
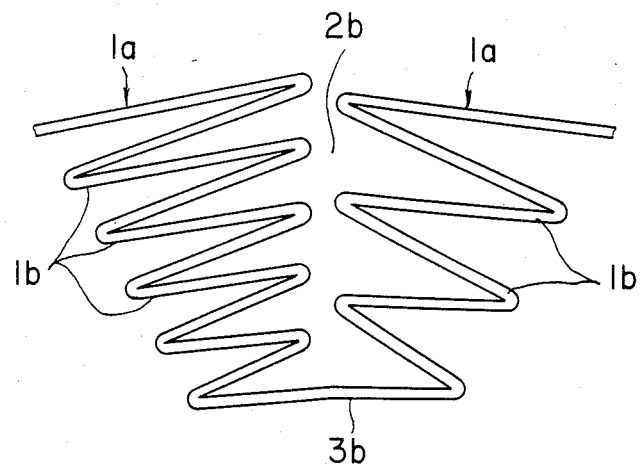

FIG. 9 illustrates an air cleaner in which the filter element 8 is incorporated. The air cleaner includes plastic casing and cap 19 and 20 between which the filter element 8 is disposed with gaskets 21 and 22 interposed between the opposite ends of the filter element 18 and the cap 20 and the casing 19. The cap and casing are detachably fastened together by clamps, not shown, with a third gasket 23 interposed therebetween. The casing 19 is provided with an air inlet 24.

Referring back to FIG. 1, the circumferentially opposed ends or turns of the pleats 1b of each of the circumferentially adjacent pairs of the radial sections 1a which define the radial spaces 2b having closed radially inner ends are shown as being in contact with each other, but may alternatively be spaced from each other. In addition, the pleats 1b are shown as being relatively widely spaced from each other in the radial direction, but may alternatively be more close to each other to an extent where the spacing between respective pleats 1b of each radial section 1a will not impede the flow of the fluid therethrough.

Modified forms of the radial sections 1a are shown in FIGS. 10 through 14. In the modification shown in FIG. 14, the pleats 1b of a radial section 1a are different in number from the pleats 1b of a circumferentially adjacent radial section 1a.

Figure 15:
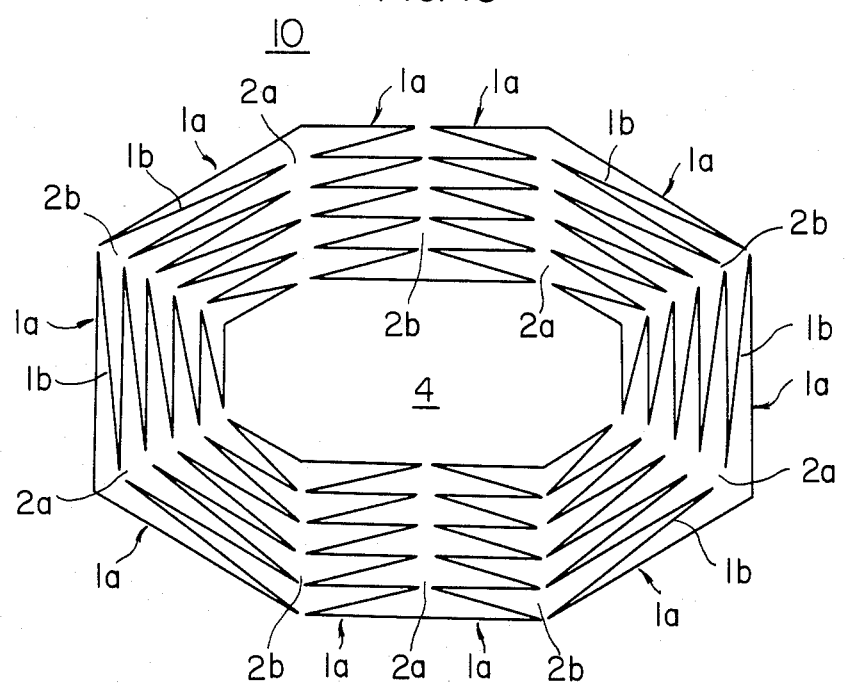
FIG. 15 is a plan view of a further modified form of the ring-like structure.

The ring-like structure 10 has been described as being formed by a continuous length of a ribbon 1 of a filtering sheet material. However, this is not essential for the invention and the ring-like structure 10 may alternatively be formed by a plurality of circumferentially arranged blocks, each comprising a pair of radial sections 1a such as those shown in FIG. 10, which are connected or bonded by an adhesive into a generally ring-like shape as shown in FIG. 1. The shape of the ring-like structure 10 may be modified to a shape shown in FIG. 15.

Figure 16:
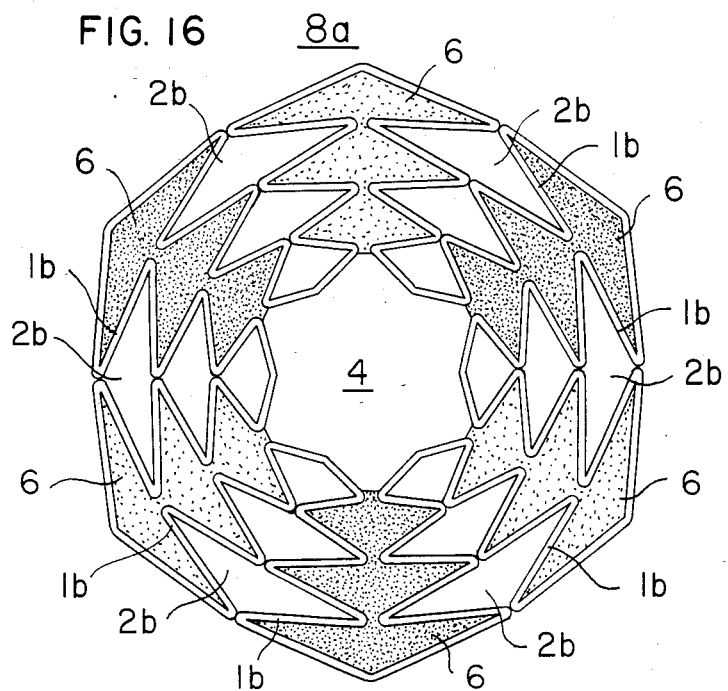
FIG. 16 is a plan view of another embodimen of the filter element according to the present invention.

FIG. 16 shows another embodiment 8a of the filter element, in which the top and bottom walls (only the top walls are shown as at 6 in FIG. 16) of the radially inwardly open radial spaces (2a) are formed by layers of gas permeable foamed elastomeric material such as polyurethane, vinyl chloride and rubber and, thus are operative to filtrate the fluid when it passes through the top and bottom walls. The gas-permeability of some of the top and bottom walls is preferably different from that of a circumferentially adjacent top and bottom walls. The difference in the gas permeability is shown in FIG. 16 by the difference in the density of the spots. The foamed elastomeric material which forms the top and bottom walls may be substituted by any other gas permeable material.

Figure 17:
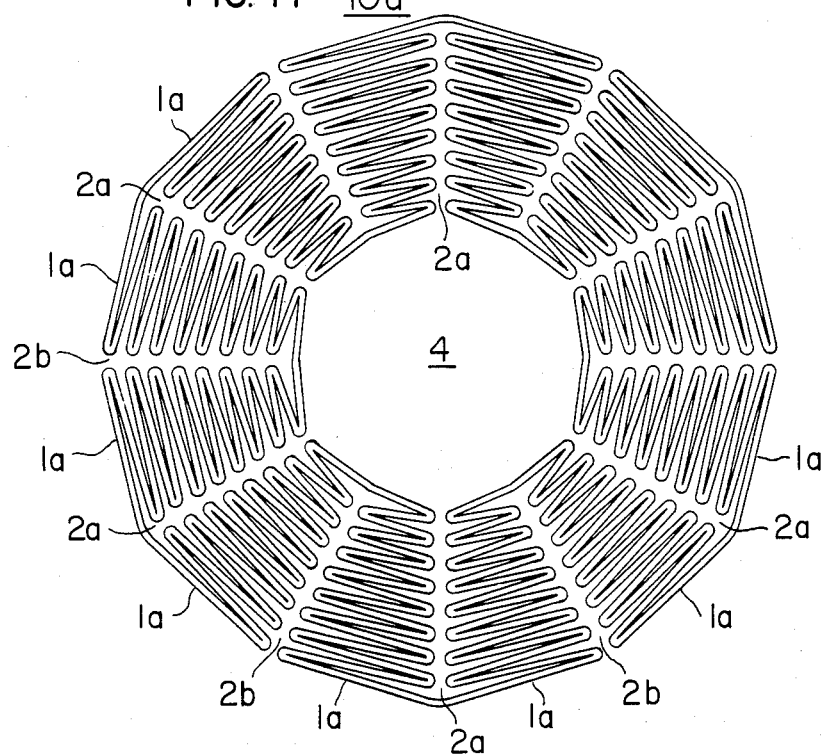
FIG. 17 is a plan view of a further modified form of the ring-like structure.
Figure 18:
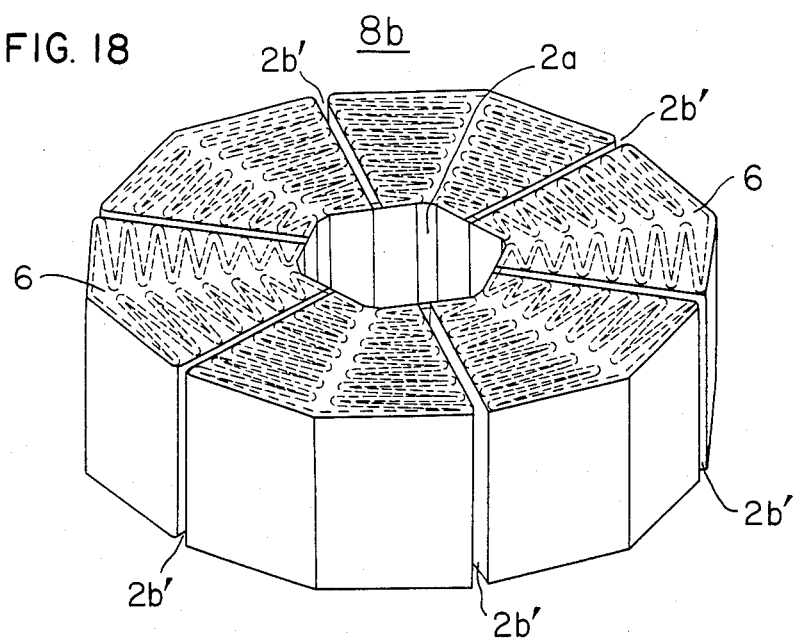
FIG. 18 is a perspective view of a filter element incorporating the ring-like structure shown in FIG. 17.
Figure 19:
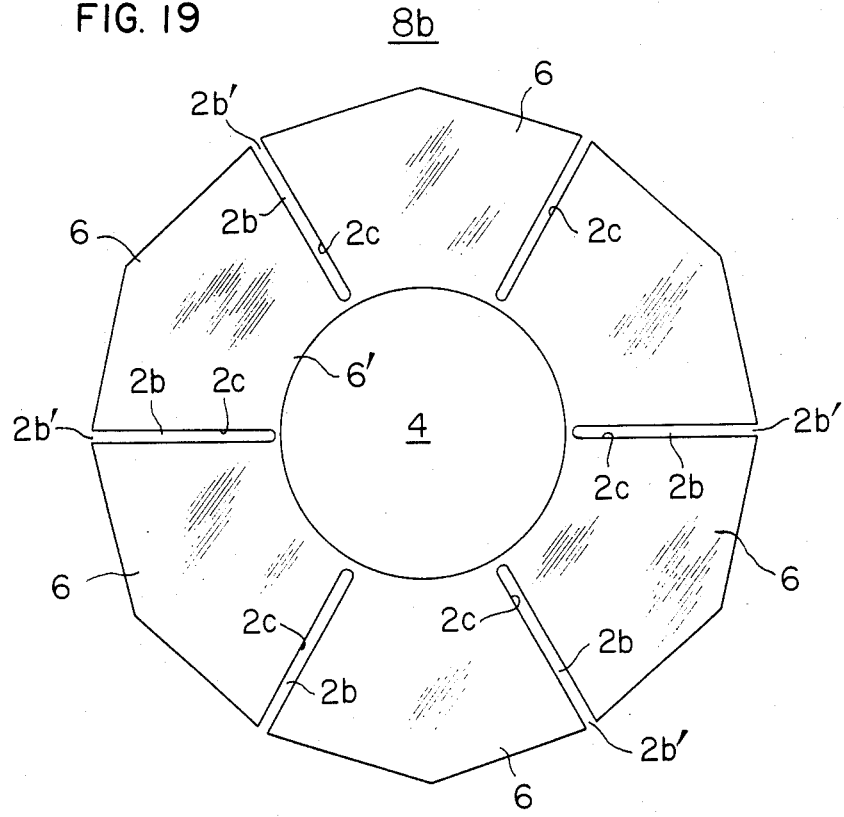
FIG. 19 is a plan view of the filte element shown in FIG. 18.
Figure 20:
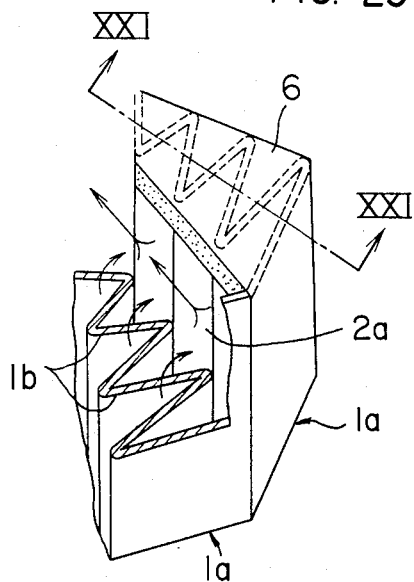
FIG. 20 is a fragmentary perspective view of the filter element shown in FIG. 19 with a part cut away to show the inner structure.
Figure 21:
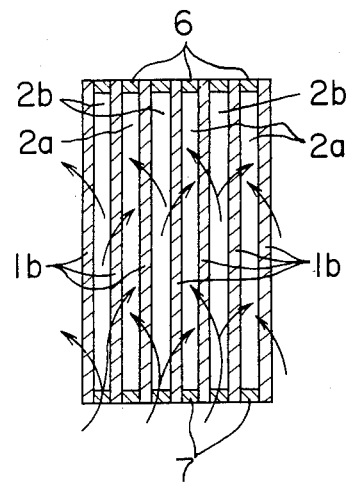
FIG. 21 is an enlarged sectional view of the filter element of FIG. 19 taken along line XXI—XXI in FIG. 20.

FIGS. 17 through 21 show a further embodiment of the filter element according to the present invention. This filter element 8b has top and bottom walls 6 and 7 which close the axially opposite ends of each of the radially inwardly open radial spaces 2a in a modified ring-like structure 10a in which the radial spaces 2b having closed radially inner ends are radially outwardly open, as best seen in FIG. 17, to provide axial slits 2b' in the outer peripheral surface of the filter element 8b. The top and bottom walls 6 and 7 are circumferentially continuous only at their inner peripheral edge sections (only one of which is shown as at 6' in FIG. 19) and are circumferentially separated from each other to provide elongated radial slits 2c which are aligned with the axial slits 2b' and communicated with the radially outwardly open radial spaces 2b in the ring-like structure 10a, as will be seen in FIGS. 18 and 19. In the illustrated embodiment of the invention, six axial slits 2b' are formed in the outer peripheral surface of the filter element 8b. Thus, the top and bottom walls 6 and 7 each provide six radial slits 2c. The fluid to be filtrated can flow either through the radial slits 2c or through the axial slits 2b' into the radially outwardly open radial spaces 2b from which the fluid flows into the radially inwardly open radial spaces 2a (FIG. 17) through the pleats which form the radial sections 1a, whereby the fluid can be filtrated by the filtering sheet material which forms the pleats.

The shapes of the ring-like structure 10a and the filter element 8b are not limited to those shown in FIGS. 17 to 20 and may alternatively have different number of corners on their outer peripheries provided that the corners provide generally ring-like outer appearance. For example, the filter element 8b will be given a circular or annular shape when the radial sections 1a of the ring-like structure 10a shown in FIG. 17 is formed by such radial sections 1a as those shown in FIG. 10.

Figure 22:
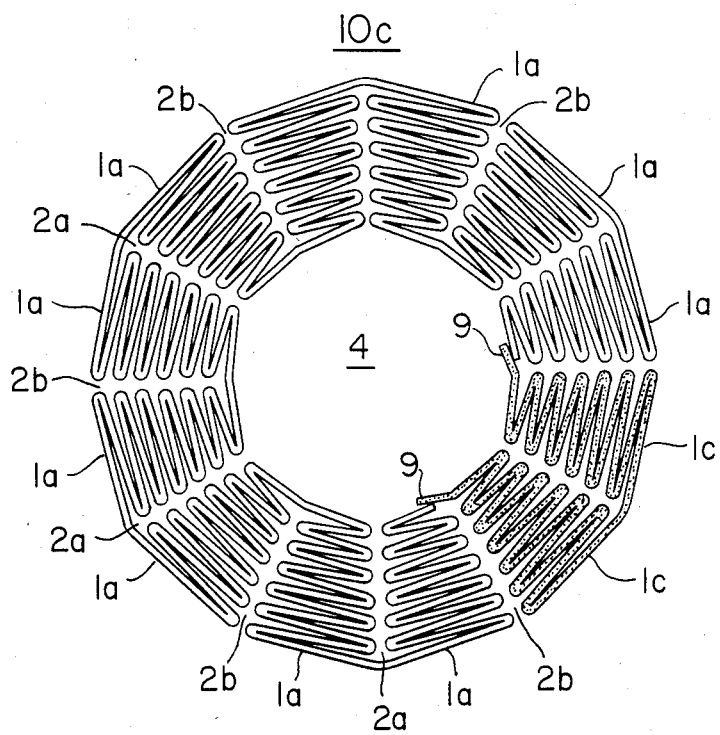
FIG. 22 is a plan view of a still further modified ring-like structure.

FIG. 22 shows a still further modified ring-like structure 10c which includes two radial sections 1c having a gas permeability different from that of other radial sections 1a. More specifically, the radial sections 1c have a gas permeability of 20 sec./300 ml while the gas permeability of the other radial sections 1a is 2 sec./300 ml. The radial sections 1c are bonded at their radially inner ends 9 to the radially inner ends of the adjacent ones of the other radial sections 1a by means of an adhesive such as a polyamid-based heat-meltable plastic adhesive.

The radial sections 1a may be formed of a ribbon of filtering sheet material of a thickness of about 0.9 mm while the radial sections 1c may be formed of filtering sheet material of a thickness of about 1.5 mm, whereby the two kinds of the radial sections 1a and 1c can have different permeabilities. The radial sections 1c may prefarably have a filtration surface area which is from 1/6 to 1/12 of the total filtration surface area of the other radial sections 1a.

Figure 23:
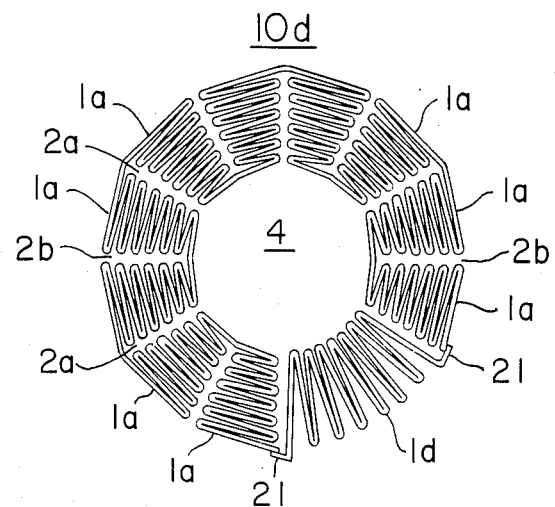
FIGS. 23 through 25 are plan views of still further modified ring-like structures, respectively.

FIG. 23 shows a still further modified ring-like structure 10d which includes a fan-shaped sector 1d comprising generally radial pleats of a filtering sheet material. The radial pleats of the sector 1d provide a permeability different from those of the radial sections 1a. The outer ends 21 of the sector 1d are secured to the outer ends of the circumferential zigzag pleats of the adjacent radial sections 1a.

Figure 24:
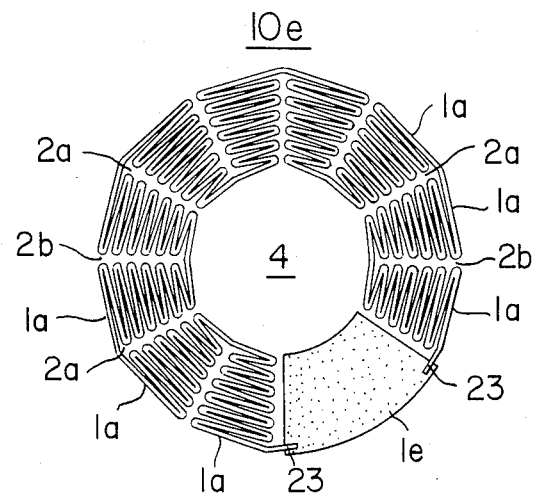

In a still further modified ring-like structure 10e shown in FIG. 24, the sector 1d shown in FIG. 23 is replaced by a block 1e of a filtering material such as a mass of stacked fibers or sintered material. The block 1e has radial side faces in which grooves 23 are formed to receive the ends of the outermost pleats of the adjacent radial sections 1a. The mass of stacked fibers referred to above is prepared by bonding natural or artificial fibers and molding them to a desired shape, so that the mass is gas permeable. The sintered material is formed by thermally bonding particles of a metal or a plastic material into a gas-permeable block having faces to which carrier plates of a plastic material or a metal are secured for the purpose of connecting the block to the adjacent radial sections 1a of the ring-like structure 10e.

Figure 25:
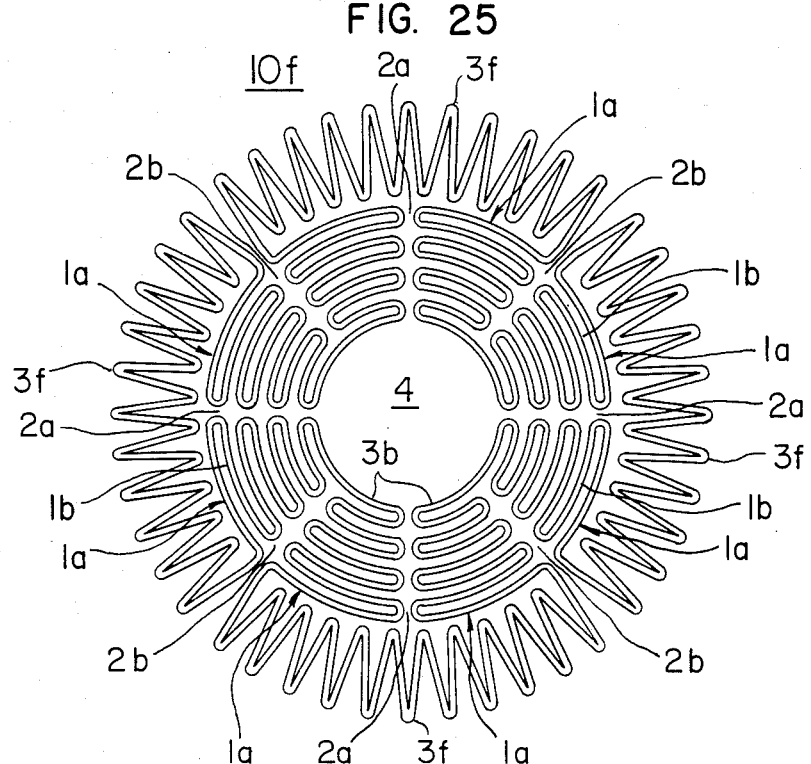

FIG. 25 shows a still further modified ring-like structure 10f in which the radially outer end of each of the radially inwardly open radial spaces 2a defined between two radial sections 1a is closed by a generally arcuate circumferential section 3f comprising a plurality of substantially radial pleats. The circumferential section 3f is continuous or integral at its ends with the radially outermost pleats 1b of the two radial sections 1a which define therebetween the radially inwardly open radial space 2a. The embodiment shown in FIG. 25 has four arcuate circumferential sections 1b arranged to form a circumferentially discontinuous circle which is interrupted by four radially outwardly open radial spaces 2b. The axially opposite ends of each of the radially inwardly open radial spaces 2a are closed by top and bottom walls (the top wall only is shown by 6f in FIGS. 26 and 17) formed by layers of polyvinyl chloride sol based adhesive.

Figure 29:
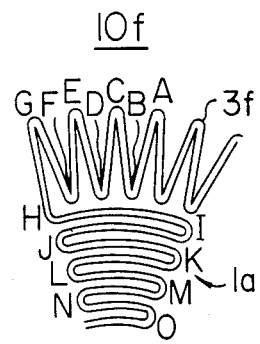
FIG. 29 is a plan view of a part of the ring-like structure formed by folding the part of the filtering sheet material shown in FIG. 28.
Figure 28:
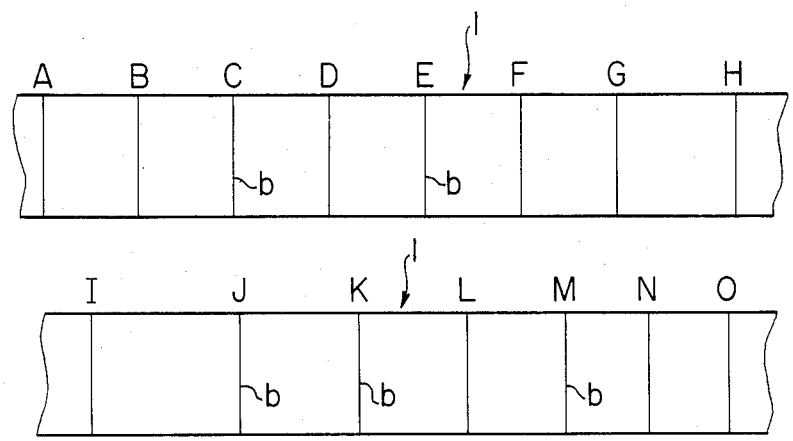
FIG. 28 is a fragmentary development view of the filtering sheet material which forms the ring-like structure shown in FIGS. 25–27.

The ring-like structure 10f can be formed by folding a ribbon 1 of a filtering sheet material along crease lines b shown in FIG. 28 to form pleats. The ends or turns A–O of the pleats correspond to the crease lines b, as will be seen in FIGS. 28 and 29.

Figure 26:
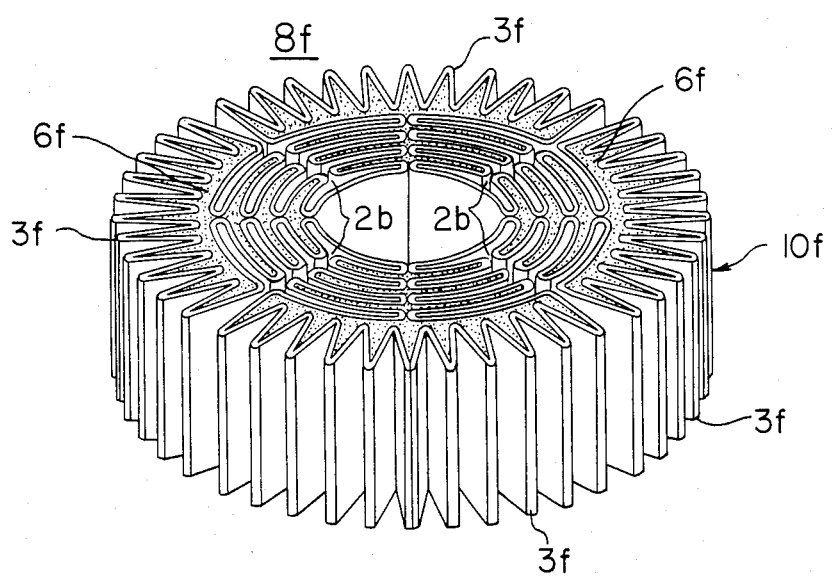
FIG. 26 is a perspective view of a still further embodiment of the filter element which incorporates the ring-like structure shown in FIG. 25.
Figure 27:
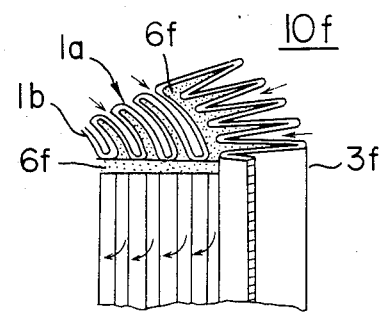
FIG. 27 is a fagmentary perspective view of the ring-like structure shown in FIGS. 25 and 26 with a part cut away to show the inner structure.

When the filter element 8f shown in FIG. 26 is installed such that the fluid to be filtrated flows into the radially outwardly open radial spaces 2b passes into the radially inwardly open radial spaces 2a through the circumferentially zigzag pleats 1b of the radial sections 1a so that the fluid is filtrated by the pleats.

Figure 30:
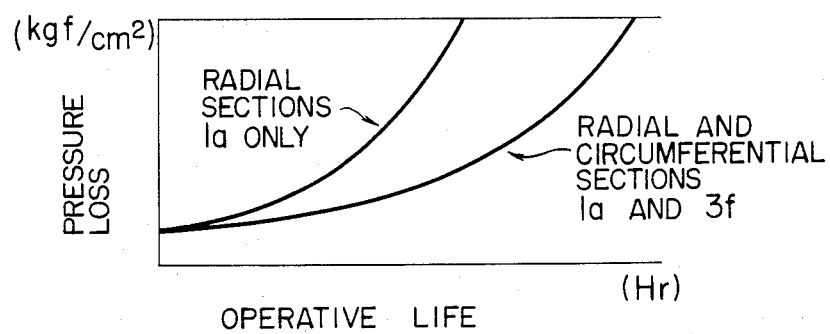
FIG. 30 graphically illustrates an operation characteristic of the ring-like structure shown in FIGS. 25–27.

FIG. 30 graphically illustrates the results of tests conducted to examine the operative lives of a filter element having the radial sections 1a only and of another filter element having both of the radial sections 1a and circumferential sections 3f. Comparison of the curves shown in FIG. 30 clearly shows that the operative life of the filter element with the radial and circumferential sections 1a and 3f is about 1.5 times of that of the filter element with the radial sections 1a only. The tests were conducted in accordance with the provision by D1611 of JIS (Japanese Industrial Standard).

Figure 36:
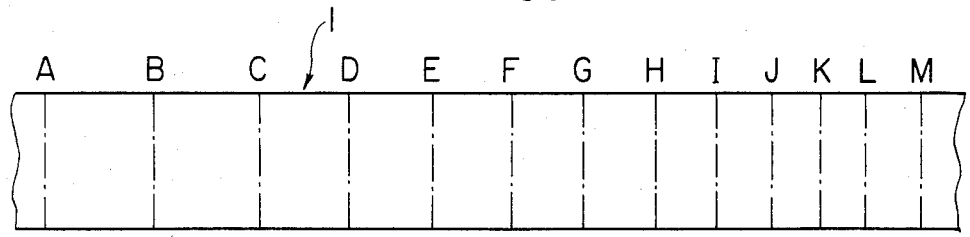
FIG. 36 is a fragmentary development view of the filtering sheet material which forms the ring-like structure shown in FIG. 31.

FIGS. 31 through 37 show a still further embodiment of the filter element according to the present invention. The filter element of this embodiment is generally designated by reference numeral 8g in FIG. 32 and includes a ring-like structure 10g (FIG. 31) formed from a continuous ribbon 1 of a filtering sheet material (FIG. 36). The ring-like structure 10g comprises a plurality of radial sections 1a-1 circumferentially arranged in closely spaced relationship to define a central space 4. Each of the radial sections 1a-1 is formed by a plurality of circumferentially zigzag pleats 1b and a substantially radially extending planar web 1g which connects the innermost pleat 1b of a radial section 1a-1 to the outermost pleats 1b of a circumferentially adjacent radial section 1a-1. The zigzag pleats 1b of each radial section 1a-1 coopeate with the two adjacent radial webs 1g to define two generally combshaped spaces 2a-1 and 2b-1, the space 2a-1 being open at its radially inner end 2a-1' to the central space 4 and the other space 2b-1 having its radially outer end 2b-1' open in the outer periphery of the ring-like structure 10. Thus, the spaces 2a-1 and 2b-1 may be called "radially inwardly open space" and "radially outwardly open space", respectively.

The axially opposite ends of the radially inwardly open spaces 2a-1 are closed by top and bottom walls 6g and 7g formed of layers of a plastic material such as vinyl chloride sol based adhesive, as best seen in FIGS.

34 and 35. Thus, when the filter element 8g of the described structure is installed such that the fluid to be filtrated enters the filter element from below, the fluid first enters the radially outwardly open spaces 2b-1 from which the fluid then passes through the zigzag pleats 1b and the radial webs 1g into the radially inwardly open spaces 2a-1 whereby the fluid is filtrated by the filtering material. The fluid then flows through the radially inner ends 2a-1' into the central space 4.

Figure 37:
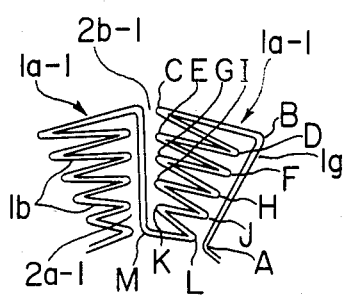
FIG. 37 is a plan view of a part of the ring-like structure formed by folding the part of the filtering sheet material shown in FIG. 36.

FIGS. 36 and 37 illustrate the correspondence between the ends or turns A–M of the pleats 1b and the crease lines b of the ribbon 1 of the filtering sheet material.

Figure 32:
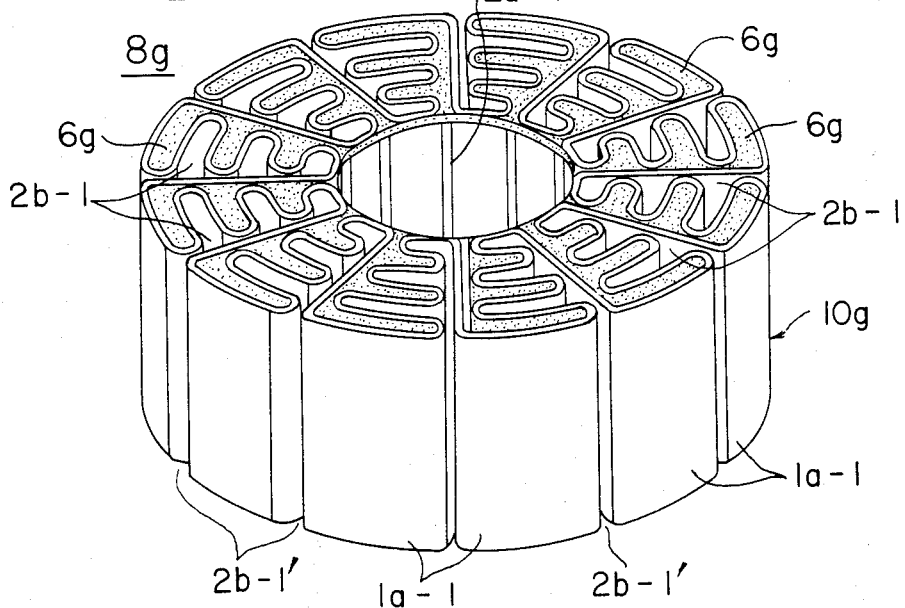
FIG. 32 is a perspective view of a further embodiment of the filter element incorporating the ring-like structure shown in FIG. 31.
Figure 33:
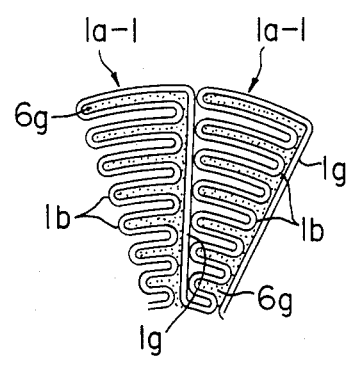
FIG. 33 is a plan view of a part of the filter element shown in FIG. 32.
Figure 34:
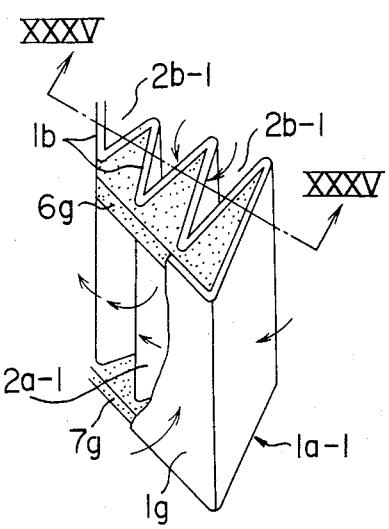
FIG. 34 is a fragmentary perspective view of a filter element of the type shown in FIG. 32 with a part cut away to show the inner structure.
Figure 35:
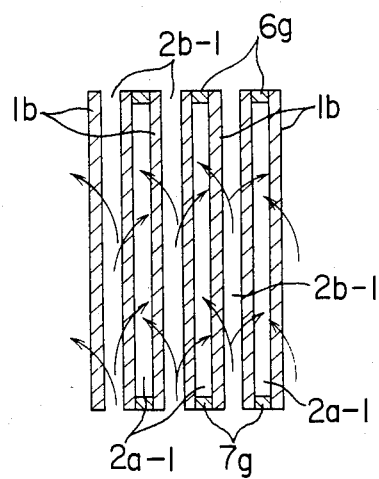
FIG. 35 is an enlarged section taken along line XXXV—XXXV in FIG. 34.
Figure 38:
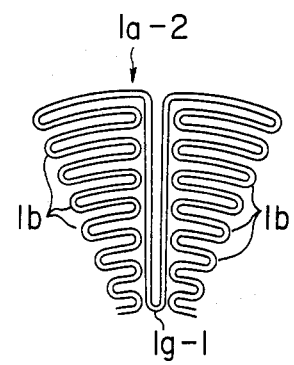
FIGS. 38 and 39 are fragmentary plan views of the radial sections of still further modified ring-like structures, respectively.
Figure 39:
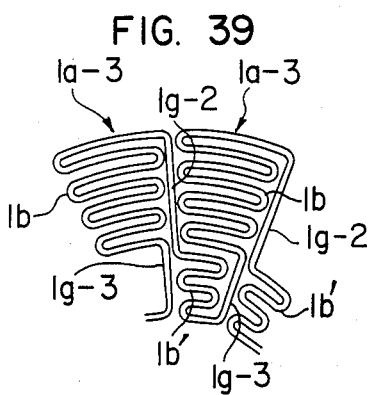

The filter element 8g shown in FIG. 32 may be modified as shown in FIGS. 38 and 39. In the modification shown in FIG. 38, each radial section 1a-2 comprises two radial rows of a plurality of circumferentially zigzag pleats 1b and a substantially radially extending planar pleat 1g-1 extending between the two radial rows of the circumferential pleats 1b. The legs of the radial pleat 1g-1 are integral with the radially outermost pleats 1b of the two radial rows. The radial pleat 1g-1 defines therein a radially outwardly open space and cooperates with the adjacent radial rows of pleats to define radially inwardly open spaces.

In the modification shown in FIG. 39, a radially extending planar web 1g-2 of each radial section 1a-3 has an inner end portion which is bent or folded to form a plurality of circumferential pleats 1b' and a radially extending planar web part 1g-3 which is continuous with the innermost pleat 1b.

Figure 31:
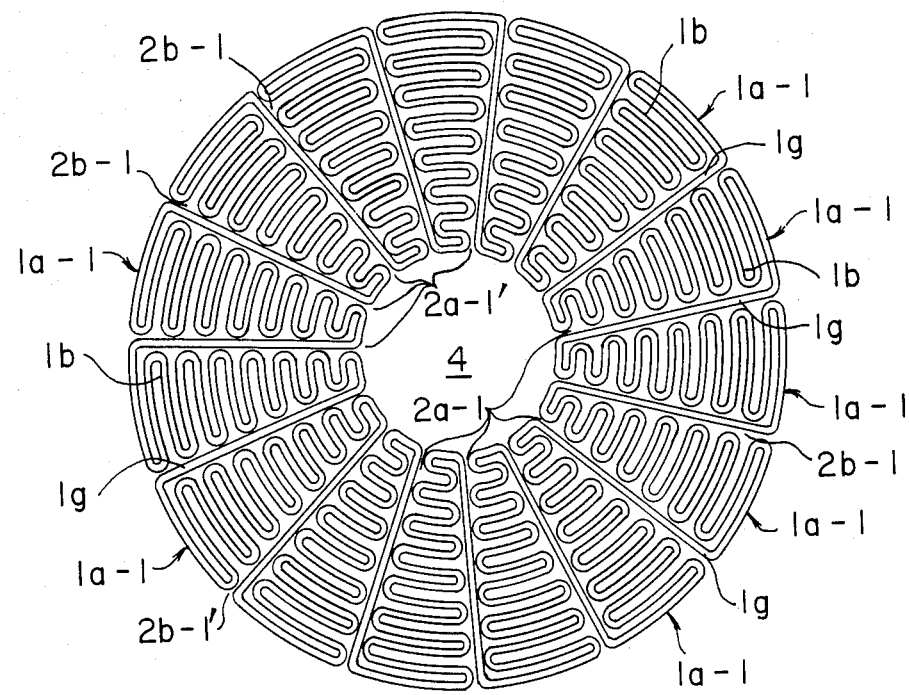
FIG. 31 is a plan view of a still further modified ring-like structure.

The ring-like structure 10g shown in FIG. 31 may also be modified as follows:

(1) It is not essential that all of the radial sections have the radial webs 1g. In other words, some of the radial sections may be formed by the circumferential zigzag pleats 1b. only. In this case, the circumferential zig-zag pleats 1b are disposed in radial rows.

(2) The axial ends of not only the radially inwardly open spaces 2a-1 but also the radially outwardly open spaces 2b-1 may be cloed by the top and bottom walls 6g and 7g.

(3) It is not essential that the ring-like structure is formed from a continuous ribbon 1 of the filtering sheet material. Namely, the ring-like structure can be formed by adhesively connecting a plurality of blocks or modules, such as one shown in FIG. 33, each of which is formed from a length of ribbon of the filtering sheet material.

(4) The top and bottom walls 6g and 7g may be formed by layers of a gas permeable material so that these walls also act to filtrate a fluid.

The described embodiments of the present invention provide following advantages:

(a) In the embodiment of the filter element shown in FIGS. 1 through 29, the radial sections each having circumferentially zigzag pleats are circumferentially arranged such that the turns of the pleats of each circumferentially adjacent pair of the radial sections are disposed in closely spaced relationship. In addition, the radially inwardly open radial spaces are closed at their axially opposite ends. These features assure improved mechanical strength of the filter element and greatly increase the filtration surface area of the filtering element. Particularly, all the zigzag pleats provide filtration surfaces to increase the filtration surface area of the filter element. Thus, the filter element can be of a descreased dimension as compared with the size of the prior art filter element of the same capacity.

(b) In the modifications in which a gas permeable material is used to form a part of the filter element, this part shares the filtration operation with the part of the filtering element formed by the filtering sheet material. Thus, the load on the latter part of the filter element is advantageously reduced, so that the filter element as a whole provides an improved filtration efficiency.

(c) In the modification in which at least one of the axially opposite end faces is formed therein with a plurality of radial slits with the other parts of the end faces being all closed by the top and bottom walls, the slits facilitate closing operation with a resultant reduction in the cost of manufacture. In addition, the top and bottom walls increase the mechanical strength of the radial sections of the ring-like structure with a resultant increase in the strength of the whole of the filter element.

(d) In the modification in which a part of the ring-like structure is formed by a filtering material having a filtration characteristic different from that of the rest of the ring-like structure, said part can provide a passage which is in bypass relationship to the fluid passage provided by the rest of the ring-like structure, with a resultant improvement in the filtration performance of the filter element.

(e) The filter element shown in FIGS. 25–29 in which the ring-like structure is provided with a plurality of generally circumferentially extending arcuate sections each having generally radial pleats in addition to generally radial sections each having a plurality of circumferentially zigzag pleats provides a remarkably prolonged operative life.

(f) The filter element shown in FIGS. 31 through 39, in which the axially opposite ends of the radially inwardly open radial sections are closed by top and bottom walls and generally radial and planar webs are provided in addition to circumferentially zigzag pleats, has an improved mechanical strength and the maximum filtration surface area per volume of the filter element.

What is claimed is:

1. A filter element including a generally ring-like structure including a plurality of generally radial sections each converging generally radially inwardly and having a plurality of generally circumferential zigzag pleats of a filtering sheet material, said radial sections being circumferentially arranged such that the radially inner ends of of said radial sections cooperate to define a central space disposed substantially centrally of said ring-like structure, the zigzag pleats of each radial section having circumferential dimensions which are substantially gradually decreased radially inwardly of said ring-like structure, the respective circumferential ends of the zigzag pleats of each circumferentially adjacent pair of radial sections being directed toward each other and disposed in circumferentially adjacent relationship, so that generally radial spaces are defined between said radial sections, some of said radial spaces being radially inwardly open to said central space and being closed at the radially outer ends by said filtering sheet material, the other radial spaces being closed at the radially inner ends by said filtering sheet material, said radially inwardly open radial spaces and the other radial spaces being circumferentially alternately arranged, and said radially inwardly open radial spaces being closed at the axially opposite ends by end walls.

2. A filter element according to claim 1, wherein said the other radial spaces are radially outwardly open to the outside of said ring-like structure.

3. A filter element according to claim 1, wherein said end walls are fluid-permeable.

4. A filter element according to claim 3, wherein each end wall is formed of a layer of a foamed plastic material.

5. A filter element according to claim 3, wherein the end walls of at least one of said radially inwardly open radial spaces have a fluid-permeability different from the fluid permeability of the end walls of the other radially inwardly open radial spaces.

6. A filter element including a generally ring-like structure including a plurality of generally radial sections each having a plurality of generally circumferential zigzag pleats of a filtering sheet material, each of at least some of said radial sections converging generally radially inwardly, all of said radial sections being circumferentially arranged such that the radially inner ends of said radial sections cooperate to define a central space disposed substantially centrally of said ring-like structure, the respective circumferential ends of the zigzag pleats of each circumferentially adjacent pair of radial sections being directed toward each other and disposed in circumferentially closely spaced relationship with each other, so that generally radial spaces are defined between said radial sections, some of said radial spaces being radially inwardly open to said central space and being closed at the radially outer ends by said filtering sheet material, the other radial spaces being closed at the radially inner ends by said filtering sheet material, said radially inwardly open radial spaces and the other radial spaces being circumferentially alternately arranged, wherein the axially opposite ends of said ring-like structure are provided with end walls in which radial slits are formed in communication with said the other radial spaces and wherein said the other radial spaces have radially outer ends in the form of substantially axial slits open in the outer periphery of said ring-like structure, and said radial and axial slits forming passages for a fluid to be filtered.

7. A filter element according to claim 1, wherein said ring-like structure further includes at least one additional radial section formed by a filtering material having a fluid-permeability different from those of the other radial sections.

8. A filter element according to claim 7, wherein said additional radial section is formed of another filtering sheet material and has a plurality of generally circumferentially zigzag pleats.

9. A filter element according to claim 7, wherein said additional radial section is formed of another filtering sheet material and has a plurality of generally radially zigzag pleats.

10. A filter element according to claim 7, wherein said additional radial section is formed of a block of a fluid-permeable material.

11. A filter element according to claim 1, wherein each of said radially inwardly open radial spaces is closed at the radially outer end by a generally circumferentially extending and generally arcuate section formed of said filtering sheet material and having a plurality of generally radial zigzag pleats, the arcuate sections being circumferentially arranged with their circumferential ends disposed in circumferentially spaced relationship to each other so that the arcuate sections form a circumferentially discontinuous ring of radial pleats outside the circumferentially zigzag pleats.

12. A filter element including a generally ring-like structure including a plurality of generally radial sections each converging generally radially inwardly and having a plurality of generally circumferential zigzag pleats of a filtering sheet material and at least one substantially radially extending planar web of said filtering sheet material, said radial sections being circumferentially arranged such that the radially inner ends of said radial sections cooperate to define a central space disposed substantially centrally of said ring-like structure, the zigzag pleats of each of said radial sections having circumferential dimensions which are substantially gradually decreased radially inwardly of said ring-like structure, the zigzag pleats of each radial section being disposed in circumferentially adjacent relationship to the planar web of the radial section to cooperate therewith to define a first space radially inwardly open to said central space, the zigzag pleats of each radial section being disposed in circumferentially adjacent relationship to the planar web of a circumferentially adjacent radial section to cooperate therewith to define a second space separated by said filtering sheet material from said central space, and the axially opposite ends of said first space being closed by end walls.

13. A filter element according to claim 12, wherein said second space is radially outwardly open in the outer periphery of said ring-like structure.

14. A filter element according to claim 12, wherein each said end wall is formed by a layer of a plastic material.

15. A filter element according to claim 12, wherein the planar web of each radial section connects the radially innermost pleat thereof to the radially outermost pleat of an adjacent radial section.

16. A filter element according to claim 12, wherein the planar web of each radial section has an inner end portion bent to form additional circumferential pleats and a generally radial web part which is continuous with the innermost pleat of the radial section, the radially outer end of the planar web of each radial section being connected to the radially outermost pleat of an adjacent radial section.

17. A filtering element including a generally ring-like structure including a plurality of generally radial sections each converging generally radially inwardly of said ring-like structure and having two substantially radially extending and circumferentially spaced rows of circumferentially zigzag pleats and a substantially radially extending pleat extending between the two radial rows of the circumferentially zigzag pleats, said radial sections being circumferentially arranged such that the radially inner ends of said radial sections cooperate to define a central space disposed substantially centrally of said ring-like structure, the circumferentially zigzag pleats of each row having circumferential dimensions which are substantially gradually reduced radially inwardly of said ring-like structure, said radial pleat having legs connected to the radially outermost pleats of said two radial rows, and said radial pleat defining therein a radially outwardly open space and being disposed in circumferentially adjacent relationship to said two radial rows of circumferential zigzag pleats to cooperate therewith to define radially inwardly open spaces communicated with said central space.

* * * * *